United States Patent [19]
Takemoto et al.

[11] Patent Number: 5,723,399
[45] Date of Patent: Mar. 3, 1998

[54] ETHYLENIC POLYMERIZATION CATALYST

[75] Inventors: Yasunori Takemoto; Takashi Monoi; Shintaro Inazawa; Shinya Waki, all of Oita, Japan

[73] Assignee: Showa Denko K.K., Tokyo, Japan

[21] Appl. No.: 712,669

[22] Filed: Sep. 13, 1996

[30] Foreign Application Priority Data

Sep. 14, 1995 [JP] Japan .................. 7-237250

[51] Int. Cl.[6] ........................ C08F 4/22
[52] U.S. Cl. .................. 502/113; 502/117; 502/152; 502/155; 526/114; 526/115; 526/118; 526/119; 526/943
[58] Field of Search ............... 502/113, 117, 502/152, 155; 526/114, 115, 118, 119

[56] References Cited

U.S. PATENT DOCUMENTS

| | | | |
|---|---|---|---|
| 4,701,432 | 10/1987 | Welborn, Jr. ............ | 502/113 |
| 4,937,299 | 6/1990 | Ewen et al. .............. | 526/119 |
| 5,393,720 | 2/1995 | Carney et al. ............ | 502/117 |
| 5,593,931 | 1/1997 | Beach et al. ............. | 502/117 |

FOREIGN PATENT DOCUMENTS

| | | |
|---|---|---|
| 0339571 | 11/1989 | European Pat. Off. . |
| 0416786 | 3/1991 | European Pat. Off. . |
| 0595182 | 5/1994 | European Pat. Off. . |
| 9215619 | 9/1992 | WIPO . |

*Primary Examiner*—David W. Wu
*Attorney, Agent, or Firm*—Sughrue, Mion, Zinn, Macpeak & Seas, PLLC

[57] ABSTRACT

An ethylenic polymerization catalyst comprising (A) a chromium compound, (B) a carrier, (C) aluminoxane, and (D) a transition metal compound comprising a group having conjugated π electron as a ligand, wherein said chromium compound (A) is not calcined; and a process for producing an ethylenic polymer comprising a step of polymerizing a monomer comprising ethylene in the presence of the ethylenic polymerization catalyst.

6 Claims, 1 Drawing Sheet

ETHYLENIC POLYMERIZATION CATALYST

FIELD OF THE INVENTION

The present invention relates to an ethylenic polymerization catalyst. More particularly, the present invention relates to a novel catalyst for use in the preparation of an ethylenic polymer having a wide distribution of molecular weight and a great melt tension.

BACKGROUND OF THE INVENTION

In general, an ethylenic polymer is widely used as a resin material of various molded articles. The ethylenic polymer has different requirements depending on how it is molded and what it is used for. In particular, as an ethylenic polymer to be molded into inflation film or to be blow-molded there is preferably used one having a relatively high molecular weight and a wide molecular weight distribution.

As methods for the preparation of an ethylenic polymer having the foregoing properties there have been heretofore proposed many methods which comprise single-stage or multi-stage polymerization in the presence of a so-called Ziegler catalyst comprising a titanium compound, a magnesium compound and a halogen to prepare an ethylenic polymer having the foregoing properties (as described, e.g., in JP-A-56-90809 (The term "JP-A" as used herein means an "unexamined published Japanese patent application"), JP-A-60-106806, JP-A-2-123108, JP-A-4-18407, and JP-A-5-230136).

A process for the preparation of an ethylenic polymer in the presence of a so-called Phillips catalyst having chromium trioxide supported on an inorganic oxide is known. A process for the preparation of an ethylenic polymer in the presence of a non-calcined catalyst having a chromium compound such as (pentamethylcyclopentadienyl) chromium and (2-methylpentadienyl) chromium supported on an inorganic oxide is proposed (as described, e.g., in JP-A-3-93804).

In order to provide a wider molecular weight distribution, the use of a catalyst obtained by treating a Phillips catalyst or non-calcined chromium catalyst with an organic aluminum compound such as aluminoxane has been proposed (as described, e.g., in JP-A-2-105806, JP-A-2-185506, JP-A-7-503739, and U.S. Pat. No. 4,564,660). Further, a two-stage polymerization in the presence of a catalyst comprising a Ziegler catalyst and a catalyst obtained by treating a Phillips catalyst with an organic aluminum compound in combination has been proposed (as described, e.g., in JP-A-62-207307 and JP-B-7-103177 (The term "JP-B" as used herein means an "examined Japanese patent publication")).

In recent years, a single-stage process using a Phillips catalyst or Ziegler catalyst and a so-called metallocene catalyst in combination or two or more metallocene catalysts in combination has been proposed to provide a wider molecular weight distribution (as described, e.g., in JP-A-1-503715, JP-A-1-292009, JP-A-3-203903, JP-A-4-220405, JP-A-6-122719, JP-A-7-173209, JP-A-8-41118, JP-A-8-100018, and JP-B-8-13856). However, the molecular weight distribution of the ethylenic polymer prepared in the presence of such a catalyst is not on a sufficient level. Further, the preparation process using the catalyst system comprising a chromium compound and an aluminoxane as disclosed in the above cited JP-A-7-503739 is remarkably complicated for obtaining a wider molecular weight distribution and thus is not practical.

Further, the preparation process using a catalyst comprising a Phillips catalyst, an aluminoxane and a metallocene complex as disclosed in JP-A-1-292009 requires tens of minutes, occasionally more than 1 hour until the initiation of the polymerization by the Phillips catalyst (there is a so-called induction period). During this induction period, the polymerization by a metallocene catalyst proceeds, producing a polymer containing only a small amount of a polymer obtained in the presence of the metallocene catalyst or the Phillips catalyst. Eventually, a blend of these polymers is produced. The resulting polymer has a wider molecular weight distribution but is disadvantageous in that it has an insufficient dispersibility, shows some melt fracture and exhibits a low strength (e.g., low breaking strength at tensile test, i.e., low tensile elongation at break).

SUMMARY OF THE INVENTION

An object of the present invention to provide a catalyst for the efficient preparation of an ethylenic polymer having a wide distribution of molecular weight and a great melt tension.

Another object of the present invention is to provide a process for producing an ethylenic polymer using the above catalyst.

The above and other objects and effects of the present invention will become more apparent from the following detailed description and examples.

The present invention relates to an ethylenic polymerization catalyst comprising (A) a chromium compound, (B) a carrier, (C) aluminoxane, and (D) a transition metal compound comprising a group having conjugated π electron as a ligand, wherein said chromium compound (A) is not calcined.

The present invention also relates to a process for producing an ethylenic polymer. The process comprises a step of polymerizing a monomer comprising ethylene in the presence of the above-described ethylenic polymerization catalyst.

The ethylenic polymerization catalyst according to the present invention, which is also used in the process for producing an ethylenic polymer according to the present invention, includes the following preferred embodiments:

(1) An ethylenic polymerization catalyst according to the present invention, wherein the chromium compound (A) is at least one compound selected from the group consisting of chromium carboxylate, chromium-1,3-diketo compound, chromic acid ester, and chromium amide compound.

(2) An ethylenic polymerization catalyst according to the present invention and the preferred embodiment (1), wherein the content of chromium atom in the chromium compound (A) is from 0.01 to 5% by weight based on the amount of the carrier (B).

(3) An ethylenic polymerization catalyst according to the present invention and the preferred embodiments (2) and (3), wherein the aluminoxane (C) contains aluminum atom in an amount of from 1 to 600 mols per mol of chromium atom in the chromium compound (A), and the transition metal compound (D) comprising a group having conjugated π electron as a ligand is contained in an amount of from 0.01 mmol to 10 mols per mol of chromium atom in the chromium compound (A).

(4) An ethylenic polymerization catalyst according to the present invention and the preferred embodiments (1) to (3), wherein the ethylenic polymerization catalyst further comprises (E) an organic metal compound incorporated therein.

(5) An ethylenic polymerization catalyst according to the present invention and the preferred embodiments (1) to (4), wherein the total amount of metal atoms in the organic metal compound (E) is from 1 to 2,000 mols per mol of metal atom in the transition metal compound (D) comprising a group having conjugated π electron as a ligand.

BRIEF DESCRIPTION OF THE DRAWING

By way of example and to make the description more clear, reference is made to the accompanying drawing in which.

DETAILED DESCRIPTION OF THE INVENTION

Figure 1:
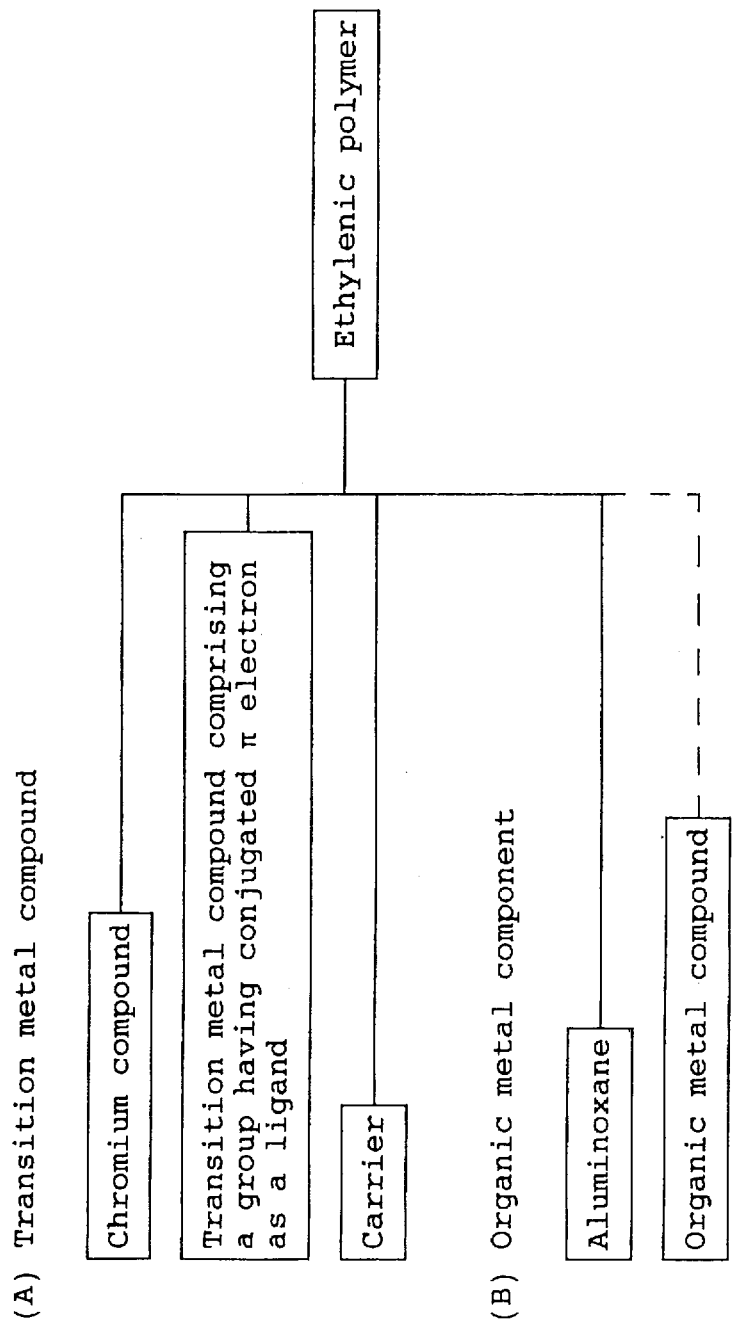
FIG. 1 is a flow chart of the preparation of an ethylenic polymerization catalyst according to the present invention.

The ethylenic polymerization catalyst according to the present invention will be further described hereinafter.

The ethylenic polymerization catalyst according to the present invention comprises a chromium compound that is not calcined after being supported on a carrier, aluminoxane, a transition metal compound comprising a group having conjugated π electron as a ligand, and optionally an organic metal compound incorporated therein.

Preferred examples of the chromium compound employable herein include an organic chromium compound such as chromium carboxylate, chromium-1,3-diketo compound, chromic acid ester and chromium amide compound.

Examples of the chromium carboxylate include a chromium (II) or chromium (III) compound represented by formula (1) or (2):

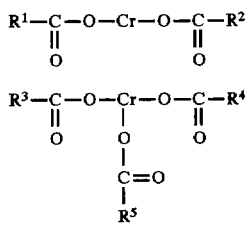

wherein $R^1$, $R^2$, $R^3$, $R^4$ and $R^5$ may be the same or different and each represent a hydrogen atom or a $C_{1-18}$ hydrocarbon group. The expression "$C_{m-n}$" used herein means "having from m to n carbon atoms".

Specific examples of these chromium compounds include chromium formate (II), chromium acetate (II), chromium propionate (II), chromium butyrate (II), chromium pentanate (II), chromium hexanate (II), chromium 2-ethylhexanate (II), chromium benzoate (II), chromium naphthenate (II), chromium oleate (II), chromium oxalate (II), chromium formate (III), chromium acetate (III), chromium propionate (III), chromium butyrate (III), chromium pentanate (III), chromium hexanate (III), chromium 2-ethylhexanate (III), chromium benzoate (III), chromium naphthenate (III), chromium oleate (III), and chromium oxalate (III). Preferred among these chromium compounds are chromium acetate (II), chromium 2-ethylhexanate (II), chromium acetate (III), and chromium 2-ethylhexanate (III).

As the chromium-1,3-diketo compound there may be used a chromium (III) complex having one to three 1,3-diketo compounds represented by formula (3):

$$CrY_e·Z^1_f·Z^2_g \qquad (3)$$

wherein Y represents a 1,3-diketo type chelate ligand; $Z^1$ and $Z^2$ are each selected from the group consisting of halogen, alkoxy, aryloxy, alkyl, aryl and amide and may be the same or different; and e represents a number of from 1 to 3, with the proviso that e, f and g satisfy the relationship:

$$e+f+g=3.$$

Specific examples of the chromium (III) complex include chromium-1,3-butanedionate, chromium acetyl acetonate, chromium-2,4-hexanedionate, chromium-2,4-heptanedionate, chromium-2,4-octanedionate, chromium-3,5-octanedionate, chromium benzoyl acetonate, chromium-1,3-diphenyl-1,3-propanedionate, chromium-2-methyl-1,3-butanedionate, chromium-2-ethyl-1,3-butanedionate, chromium-2-phenyl-1,3-butanedionate, and chromium-1,2,3-triphenyl-1,3-propanedionate. Preferred among these chromium (III) complexes is chromium acetyl acetonate.

As the chromic acid ester there may be used a chromium (VI) compound represented by formula (4):

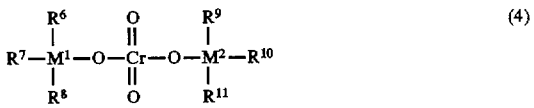

wherein $R^6$, $R^7$, $R^8$, $R^9$, $R^{10}$ and $R^{11}$ may be the same or different and each represent a $C_{1-18}$ hydrocarbon group; and $M^1$ and $M^2$ each represent a carbon atom or silicon atom.

Specific examples of the chromium (VI) compound, if $M^1$ and $M^2$ each represent a carbon atom, include bis(tert-butyl) chromate, bis(1,1-dimethylpropyl) chromate, bis(2-phenyl-2-propyl) chromate, bis(1,1-diphenylethyl) chromate, bis(triphenylmethyl) chromate, bis(1,1,2,2-tetramethylpropyl) chromate, and bis(1,1,2-trimethylpropyl) chromate. Preferred among these chromium (VI) compounds is bis(tert-butyl) chromate.

Specific examples of the chromium (VI) compound, if $M^1$ and $M^2$ each represent a silicon atom, include bis(trimethylsilyl) chromate, bis(triethylsilyl) chromate, bis(tributylsilyl) chromate, bis(triisopentylsilyl) chromate, bis(tri-2-ethylhexylsilyl) chromate, bis(tridecylsilyl) chromate, bis(tri(tetradecyl)silyl) chromate, bis(tribenzylsilyl) chromate, bis(triphenethylsilyl) chromate, bis(triphenylsilyl) chromate, bis(tritollylsilyl) chromate, bis(trixylylsilyl) chromate, bis(trinaphthylsilyl) chromate, bis(dimethylphenylsilyl) chromate, bis(diphenylmethylsilyl) chromate, bis(dimethylthexylsilyl) chromate, bis(dimethylisopropylsilyl) chromate, bis(tert-butyldimethylsilyl) chromate, bis(tri-tert-butylsilyl) chromate, bis(triethylphenylsilyl) chromate, bis(trimethylnaphthylsilyl) chromate, poly(diphenylsilyl) chromate, and poly(diethylsilyl) chromate. Preferred among these chromium (VI) compounds is bis(triphenylsilyl) chromate.

As the chromium amide compound there may be used a chromium (II) or chromium (III) compound represented by formula (5) or (6):

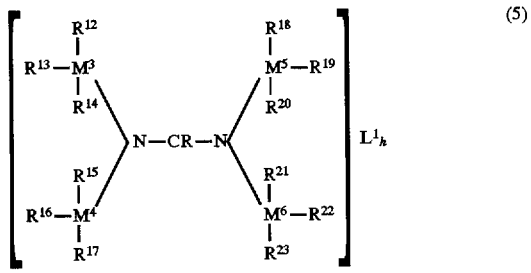

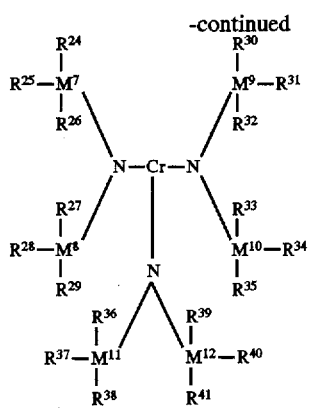

wherein $R^{12}$ to $R^{41}$ may be the same or different and each represent a hydrogen atom or a $C_{1-18}$ hydrocarbon group; $M^3$ to $M^{12}$ each represent a carbon atom and/or silicon atom; $L^1$ represents a ligand such as ether and nitrile; and h represents a number of from 0 to 2.

Specific examples of the chromium (II) or chromium (III) compound include tris(dimethylamide) chromium (III), tris (diethylamide) chromium (III), tris(diisopropylamide) chromium (III), tris(methylphenylamide) chromium (III), tris (diphenylamide) chromium (III), bis(bistrimethylsilyl amide) chromium (II)-THF complex, bis (bistrimethylsilylamide) chromium (II)-diethylether complex, bis(methyltrimethylsilyl amide) chromium (II)-THF complex, bis(methyltrimethylsilyl amide) chromium (II)-diethylether complex, bis(tert-butyltrimethylsilylamide) chromium (II)-THF complex, bis(tert-butyltrimethylsilylamide) chromium (II)-diethylether complex, bis(phenyltrimethylsilylamide) chromium (II)-THF complex, bis(phenyltrimethylsilylamide) chromium (II)-diethylether complex, tris(bistrimethylsilylamide) chromium (III), tris(bistriethylsilylamide) chromium (III), and tris(bistriphenylsilylamide) chromium (III). Preferred among these chromium (II) or chromium (III) compounds is tris(bistrimethylsilylamide) chromium (III).

Other examples of the organic chromium compound include chromium (II), chromium (III) or chromium (IV) compound represented by formula (7), (8) or (9):

$$(Cp^1)_k(R^{42})_{2-k}Cr \quad (7)$$

$$(Cp^1)(R^{42})_m(R^{43})_{2-m}Cr(L^2)_n \quad (8)$$

$$(R^{44})_pCr \quad (9)$$

wherein $Cp^1$ represents a ligand having a cyclopentadienyl skeleton such as cyclopentadienyl group, alkyl-substituted cyclopentadienyl group (e.g., methylcyclopentadienyl group, ethylcyclopentadienyl group, n-butylcyclopentadienyl group, tert-butylcyclopentadienyl group, dimethylcyclopentadienyl group, pentamethylcyclopentadienyl group), alkylsilyl-substituted cyclopentadienyl group (e.g., trimethylsilylcyclopentadienyl group), alkylgermyl-substituted cyclopentadienyl group (e.g., trimethylgermylcyclopentadienyl group) and indenyl or fluorenyl group having or free of similar substituents; $R^{42}$ and $R^{43}$ may be the same or different and each represent a $C_{1-20}$ aryl group, alkyl group, alkenyl group, alkylaryl group, arylalkyl group, silylalkyl group or alkoxy group; $R^{44}$ represents a $C_{1-20}$ aryl group, alkyl group, alkenyl group, alkylaryl group, arylalkyl group or silylalkyl group; $L^2$ represents a ligand such as ether, pyridine and THF (tetrahydrofuran); k and m each represent an integer of 1 or 2; n represents an integer of 0 or 1; and p represents an integer of from 2 to 4.

Specific examples of these organic chromium compounds include bis(cyclopentadienyl) chromium (II), bis(indenyl) chromium (II), bis(fluorenyl) chromium (II), (pentamethylcyclopentadienyl) (cyclopentadienyl) chromium (II), (pentamethylcyclopentadienyl) (pentadienyl) chromium (II), (pentamethylcyclopentadienyl) (2-methylcyclopentadienyl) chromium (II), (pentamethylcyclopentadienyl) (2,4-dimethylpentadienyl) chromium (II), (pentamethylcyclopentadienyl) (dimethyl) chromium (III), (pentamethylcyclopentadienyl) dimethylchromium (III)-THF complex, (pentamethylcyclopentadienyl) bis(trimethylsilylmethyl) chromium (III), (pentamethylcyclopentadienyl) (dimethyl) chromium (III)-pyridine complex, (pentamethylcyclopentadienyl) bis(trimethylsilylmethyl) chromium (III)-pyridine complex, (pentamethylcyclopentadienyl) (dibenzyl) chromium (III)-pyridine complex, bis(allyl) chromium (II), tris(allyl) chromium (III), bis(benzene) chromium (II), bis(2,4-dimethylpentadienyl) chromium (II), octakis (trimethylsilylmethyl) tetrachromium (II), and tetrakis (trimethylsilylmethyl) chromium (IV). Preferred among these organic chromium compounds is (pentamethylcyclopentadienyl) dimethylchromium (III)-THF complex. Particularly preferred among these exemplified chromium compounds are chromic acid ester compounds and chromium amide compounds.

Examples of the carrier employable in the present invention include those commonly used as component or carrier for ordinary ethylenic polymerization catalyst such as oxide of the Group 2, 4, 13 or 14 element (according to Nomenclature of Inorganic Chemistry, 1990), phosphate of the Group 13 element and inorganic halide.

Examples of the oxide of the Group 2, 4, 13 or 14 element and the phosphate of the Group 13 element include magnesia, titania, zirconia, alumina, silica, silica-titania, silica-zirconia, silica-alumina, aluminum phosphate, gallium phosphate, and mixture thereof.

The specific surface area of the carrier is generally from 50 to 1,000 $m^2$/g, preferably from 200 to 800 $m^2$/g. The pore volume of the carrier is generally from 0.5 to 3.0 $cm^3$/g, preferably from 1.0 to 2.5 $cm^3$/g.

The oxide of the Group 2, 4, 13 or 14 element and the phosphate of the Group 13 element are preferably heated and dried at a temperature of from 100° C. to 900° C. in a stream of dried nitrogen gas which has been passed through a molecular sieves layer for 10 minutes to 24 hours before use. In particular, these carrier materials are preferably dried in a stream of a sufficient amount of nitrogen gas while being in fluidized solid state.

Examples of the inorganic halide include a halide of the Group 2 or 13 element. Examples of such a compound include magnesium chloride, magnesium bromide, magnesium iodide, calcium chloride, aluminum chloride, gallium chloride, and mixture thereof.

Examples of the aluminoxane employable herein include compounds represented by formulae (10) and (11):

$$R^{45}_2Al-(O-Al)_r-R^{45} \quad (10)$$
$$\phantom{R^{45}_2Al-(O-Al)_r-}|\phantom{R^{45}}$$
$$\phantom{R^{45}_2Al-(O-Al)_r-}R^{45}$$

wherein $R^{45}$ represents a hydrocarbon group such as methyl, ethyl, propyl, n-butyl and isobutyl, preferably methyl or isobutyl; and r represents an integer of from 1 to 100, preferably not less than 4, particularly not less than 8.

The process for the preparation of such a kind of compounds is known. Examples of the preparation process include a process which comprises adding trialkyl aluminum to a suspension of a salt having water of crystallization (e.g., hydrous copper sulfate, hydrous aluminum sulfate) in an inert hydrocarbon solvent such as pentane, hexane, heptane, cyclohexane, decane, benzene and toluene, and a process which comprises acting solid, liquid or gaseous water on trialkyl aluminum in the foregoing hydrocarbon solvent.

Alternatively, an aluminoxane represented by formula (12) or (13) may be used.

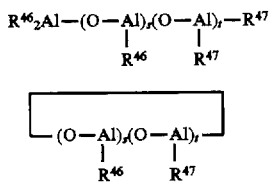

wherein $R^{46}$ represents a hydrocarbon group such as methyl, ethyl, propyl, n-butyl and isobutyl, preferably methyl or isobutyl; $R^{47}$ represents a group different from $R^{46}$ selected from the group consisting of hydrocarbon group such as methyl, ethyl, propyl, n-butyl and isobutyl, halogen such as chlorine and bromine, hydrogen and hydroxyl group, the plurality of groups represented by $R^{47}$ may be the same or different; and s normally represents an integer of from 1 to 100, preferably not less than 3, with the proviso that the sum of s and t is from 2 to 100, preferably not less than 6. In formula (12) or (13), (O -Al($R^{46}$))$_s$ unit and (O-Al($R^{47}$))$_t$ unit may be bonded to each other in the block form or regularly or irregularly at random. The process for the preparation of such an aluminoxane is similar to that of the aluminoxane of the general formulae previously described. Two or more kinds of trialkyl aluminums may be used instead of one kind of a trialkyl aluminum. Alternatively, one or more kinds of trialkyl aluminums and one or more kinds of dialkyl aluminum monohalides or dialkyl aluminum monohydrides may be used instead of one kind of a trialkyl aluminum.

Examples of the ligand in the group having conjugated π electron include a ligand having cyclopentadienyl skeleton, amidinato skeleton or allyl skeleton.

Examples of the ligand having cyclopentadienyl skeleton include cyclopentadienyl group, alkyl-substituted cyclopentadienyl group such as methylcyclopentadienyl group, ethylcyclopentadienyl group, n-butylcyclopentadienyl group, tert-butylcyclopentadienyl group, dimethylcyclopentadienyl group and pentamethylcyclopentadienyl group, alkylsilyl-substituted cyclopentadienyl group such as trimethylsilyl cyclopentadienyl group, alkylgermyl-substituted cyclopentadienyl group such as trimethylgermyl cyclopentadienyl group, and indenyl or fluorenyl group having or free of similar substituents.

Examples of the ligand having amidinato skeleton include amidinato group, alkyl-substituted amidinato group such as N,N'-bis(n-butyl)amidinato group, alkylsilyl-substituted amidinato group such as N,N'-bis(trimethylsilyl)amidinato group, aryl-substituted amidinato group such as N,N'-bis(phenyl)amidinato group, and amidinato group having plural substituents such as N,N'-bis(n-butyl)benzamidinato group and N,N'-bis(2,6-dimethylphenyl)benzamidinato group. Examples of the ligand having allyl skeleton include allyl group having or free of similar substituents.

The transition metal to be used in the present invention is the Group 3, 4, 5 or 6 transition metal element (according to Nomenclature of inorganic Chemistry, 1990), preferably the Group 4 transition metal element, i.e., titanium, zirconium or hafnium, particularly zirconium or hafnium.

Examples of the transition metal compound employable herein include those represented by formulae (14), (15), (16), (17), (18), (19), and (20):

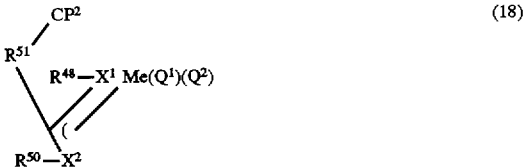

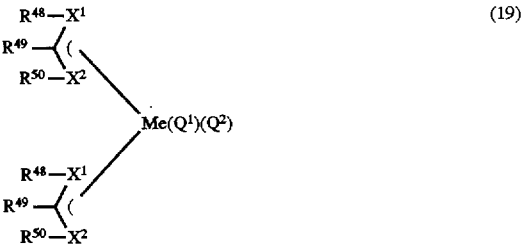

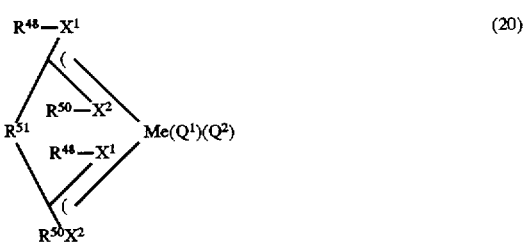

wherein $Cp^2$ and $Cp^3$ may be the same or different and each represent the foregoing ligand having cyclopentadienyl skeleton; $R^{48}$ to $R^{50}$ may be the same or different and each represent a hydrogen atom, a $C_{1-20}$ hydrocarbon group such as alkyl group, alkenyl group, aryl group, araryl group, aralkyl group and alicyclic group, alkylsilyl group or alkylgermyl group; $R^{51}$ represents a $C_{1-20}$ alkylene group, alkylgermylene group or alkylsilylene group; $X^1$ and $X^2$ may be the same or different and each represent a carbon atom or nitrogen atom; $Q^1$ and $Q^2$ may be the same or different and each represent a hydrogen atom, a $C_{1-20}$ hydrocarbon group, alkoxy group, aryloxy group, siloxy group or halogen; Y represents an electron donor ligand represented by —O—, —S—, —$NR^{52}$— or —$PR^{52}$— (in which $R^{52}$ represents a hydrogen atom, a $C_{1-20}$ hydrocarbon group, halogenated alkyl or halogenated aryl); Me represents a transition metal; and u represents an integer of 0 or 1.

Examples of $C_{1-20}$ hydrocarbon group represented by $R^{48}$ to $R^{50}$ in the foregoing formulae include an alkyl group such as methyl, ethyl, propyl, butyl,-isobutyl, tert-butyl, amyl, isoamyl, hexyl, heptyl, octyl, nonyl, decyl and cetyl, Examples of the aryl group represented by $R^{48}$ to $R^{50}$ include phenyl group. Examples of the alkylsilyl group represented by $R^{48}$ to $R^{50}$ include trimethylsilyl group. Examples of the alkylgermyl group represented by $R^{48}$ to $R^{50}$ include trimethylgermyl group.

In the foregoing general formulae, $R^{51}$ represents a $C_{1-20}$ alkylene group, alkylgermylene group or alkylsilylene group. Examples of the alkylene group include methylene group, ethylene group, propylene group, isopropylidene group, cyclopentylidene group, cyclohexylidene group, tetrahydropyrane-4-ilidene, and diphenylmethylene group. Examples of the alkylsilylene group include dimethylsilylene group, and diphenylsilylene group. Examples of the alkylgermylene group include dimethylgermylene group, and diphenylgermylene group.

$X^1$ and $X^2$ may be the same or different and each represent a carbon atom or nitrogen atom. $Q^1$ and $Q^2$ may be the same or different and each represent a $C_{1-20}$ hydrocarbon group such as alkyl, alkenyl, aryl, araryl and aralkyl, alkoxy group, aryloxy group, siloxy group or halogen.

Y represents an electron donor ligand represented by —O—, —S—, —NR$^{52}$— or —PR$^{52}$—. $R^{52}$ represents a $C_{1-20}$ hydrocarbon group such as alkyl, alkenyl, aryl, araryl and aralkyl or halogenated alkyl or halogenated aryl group. Specific examples of the group represented by $R^{52}$ include alkyl group such as methyl, ethyl, propyl, butyl, isobutyl, tert-butyl, amyl, isoamyl, hexyl, heptyl, octyl, nonyl, decyl and cetyl, phenyl group, and benzyl group. Preferred among these electron donor ligands are —NR$^{52}$— type and —PR$^{52}$— type ligands.

Specific examples of the transition metal compound represented by formula (14), (15), (16), (17), (18), (19) or (20) wherein Me is zirconium will be given below.

Examples of the transition metal compound represented by formula (14) include bis(cyclopentadienyl) zirconium dichloride, bis(methylcyclopentadienyl) zirconium dichloride, bis(n-propylcyclopentadienyl) zirconium dichloride, bis(n-butylcyclopentadienyl) zirconium dichloride, bis(n-butylcyclopentadienyl) zirconium dimethyl, bis(1,3-dimethylcyclopentadienyl) zirconium dichloride, bis(pentamethylcyclopentadienyl) zirconium dichloride, (cyclopentadienyl) (methylcyclopentadienyl) zirconium dichloride, (cyclopentadienyl) (n-butylcyclopentadienyl) zirconium dichloride, (cyclopentadienyl) (indenyl) zirconium dichloride, (cyclopentadienyl) (fluorenyl) zirconium dichloride, cyclopentadienyl zirconium trichloride, cyclopentadienyl zirconium trimethyl, pentamethyl cyclopentadienyl zirconium trichloride, and pentamethyl cyclopentadienyl zirconium trimethyl.

Examples of the transition metal compound represented by formula (15) include dimethylsilylene bis (methylcyclopentadienyl) zirconium dichloride, isopropylidene bis(methylcyclopentadienyl) zirconium dichloride, ethylene bis(indenyl) zirconium dichloride, ethylene bis(4,5,6,7-tetrahydro-1-indenyl) zirconium dichloride, isopropylidene (cyclopentadienyl) (fluorenyl) zirconium dichloride, isopropylidene (cyclopentadienyl) (indenyl) zirconium dichloride, isopropylidene (tert-butylcyclopentadienyl) (tert-butylindenyl) zirconium dichloride, and isopropylidene (tert-butylcyclopentadienyl) (tert-butylindenyl) zirconium dimethyl.

Examples of the transition metal compound represented by formula (16) include ethylene (tert-butylamide) (tetramethylcyclopentadienyl) zirconium dichloride, ethylene (methylamide) (tetramethyl cyclopentadienyl) zirconium dichloride, dimethylsilylene (tert-butylamide) (tetramethylcyclopentadienyl) zirconium dichloride, dimethylsilylene (tert-butylamide) (tetramethylcyclopentadienyl) zirconium dibenzyl, dimethylsilylene (benzylamide) (tetramethylcyclopentadienyl) zirconium dibenzyl, and dimethylsilylene (phenylamide) (tetramethylcyclopentadienyl) zirconium dichloride.

Examples of the transition metal compound represented by formula (17) include (cyclopentadienyl) (N,N'-bis (trimethylsilyl) benzamidinato zirconium dichloride, (cyclopentadienyl) (N,N'-bis(n-butyl) benzamidinato) zirconium dichloride, (cyclopentadienyl) (N,N'-bis(phenyl) benzamidinato) zirconium dichloride, (cyclopentadienyl) (N,N'-bis(2,6-dimethylphenyl) benzamidinato) zirconium dichloride, (cyclopentadienyl) (N,N'-bis(2,6-di-tert-butylphenyl) benzamidinato) zirconium dichloride, (n-butylcyclopentadienyl) (N,N'-bis(trimethylsilyl) benzamidinato) zirconium dichloride, (n-butyl cyclopentadienyl) (N,N'-bis(n-butyl) benzamidinato) zirconium dichloride, (n-butylcyclopentadienyl) (N,N'-bis (phenyl) benzamidinato) zirconium dichloride, (pentamethyl cyclopentadienyl) (N,N'-bis(trimethylsilyl) benzamidinato) zirconium dichloride, (pentamethylcyclopentadienyl) (N,N'-bis(n-butyl) benzamidinato) zirconium dichloride, (pentamethylcyclopentadienyl) (N,N'-bis(phenyl) benzamidinato) zirconium dichloride, (indenyl) (N,N'-bis (trimethylsilyl) benzamidinato) zirconium dichloride, (indenyl) (N,N'-bis(n-butyl) benzamidinato) zirconium dichloride, and (indenyl) (N,N'-bis(phenyl) benzamidinato) zirconium dichloride.

Examples of the transition metal compound represented by formula (18) include dimethylsilylene (cyclopentadienyl) (N,N'-bis(trimethylsilyl) amidinato) zirconium dichloride, dimethylsilylene (cyclopentadienyl) (N,N'-bis(phenyl) amidinato) zirconium dichloride, dimethylsilylene (cyclopentadienyl) (N,N'-bis(n-butyl) amidinato) zirconium dichloride, dimethylsilylene (tetramethylcyclopentadienyl) (N,N'-bis(trimethylsilyl) amidinato) zirconium dichloride, dimethylsilylene (tetramethylcyclopentadienyl) (N,N'-bis (phenyl) amidinato) zirconium dichloride, dimethylsilylene tetramethyl cyclopentadienyl) (N,N'-bis(n-butyl) amidinato) zirconium dichloride, dimethylsilylene (n-butylcyclopentadienyl) (N,N'-bis(trimethylsilyl) amidinato) zirconium dichloride, dimethylsilylene (n-butylcyclopentadienyl) (N,N'-bis(phenyl) amidinato) zirconium dichloride, dimethylsilylene (n-butylcyclopentadienyl) (N,N'-bis(n-butyl) amidinato) zirconium dichloride, dimethylsilylene (indenyl) (N,N'-bis (trimethylsilyl) amidinato) zirconium dichloride, dimethylsilylene (indenyl) (N,N'-bis(phenyl) amidinato) zirconium chloride, and dimethylsilylene (indenyl) (N,N'-bis(n-butyl) amidinato) zirconium dichloride.

Examples of the transition metal compound represented by formula (19) include bis(N,N'-bis (trimethylsilyl) benzamidinato) zirconium dichloride, bis(N,N'-bis(phenyl) benzamidinato) zirconium dichloride, and bis(N,N'-bis(n-butyl) benzamidinato) zirconium dichloride.

Examples of the transition metal compound represented by formula (20) include dimethylsilylene bis(N,N'-bis (trimethylsilyl) amidinato) zirconium dichloride, dimethylsilylene bis(N,N'-bis(phenyl) amidinato) zirconium dichloride, dimethylsilylene bis(N,N'-bis(n-butyl) amidinato) zirconium dichloride, isopropylidene bis(N,N'-bis (trimethylsilyl) amidinato) zirconium dichloride, isopropylidene bis(N,N'-bis(phenyl) amidinato) zirconium dichloride, and isopropylidene bis(N,N'-bis(n-butyl) amidinato) zirconium dichloride.

Examples of the transition metal compound also include compound in which the zirconium in the zirconium compounds exemplified above as transition metal compounds is replaced by hafnium or titanium.

As the transition metal compound according to the present invention there may be used one or more of the foregoing transition metal compounds in combination.

The catalyst of the present invention may be formed by bringing a chromium compound as catalyst component (A), a carrier as catalyst component (B), an aluminoxane as catalyst component (C), and a transition metal compound as catalyst component (D) into contact with each other. The order of contact of the various components is not specifically limited.

Examples of the foregoing contacting process include:

(1) a process which comprises simultaneously bringing the four components into contact with each other in a reactor for the preparation of catalyst or in the presence or absence of ethylene in an ethylene polymerization reactor to prepare a catalyst;

(2) a process which comprises bringing the catalyst component (A), the catalyst component (B) and the catalyst component (C) into contact with each other in a reactor for the preparation of catalyst, and then bringing the reaction product into contact with the catalyst component (D) in a reactor for the preparation of catalyst or in the presence or absence of ethylene in an ethylene polymerization reactor to prepare a catalyst;

(3) a process which comprises bringing the catalyst component (A), the catalyst component (B) and the catalyst component (D) into contact with each other in a reactor for the preparation of catalyst, and then bringing the reaction product into contact with the catalyst component (C) in a reactor for the preparation of catalyst or in the presence or absence of ethylene in an ethylene polymerization reactor to prepare a catalyst;

(4) a process which comprises bringing the catalyst component (B), the catalyst component (C) and the catalyst component (D) into contact with each other in a reactor for the preparation of catalyst, and then bringing the reaction product into contact with the catalyst component (A) in a reactor for the preparation of catalyst or in the presence or absence of ethylene in an ethylene polymerization reactor to prepare a catalyst;

(5) a process which comprises bringing the catalyst component (A) and the catalyst component (B) into contact with each other in a reactor for the preparation of catalyst, and then bringing the reaction product into contact with the catalyst component (C) and the catalyst component (D) in a reactor for the preparation of catalyst or in the presence or absence of ethylene in an ethylene polymerization reactor to prepare a catalyst;

(6) a process which comprises bringing the catalyst component (A) and the catalyst component (C) into contact with each other in a reactor for the preparation of catalyst, and then bringing the reaction product into contact with the catalyst component (B) and the catalyst component (D) in a reactor for the preparation of catalyst or in the presence or absence of ethylene in an ethylene polymerization reactor to prepare a catalyst;

(7) a process which comprises bringing the catalyst component (A) and the catalyst component (D) into contact with each other in a reactor for the preparation of catalyst, and then bringing the reaction product into contact with the catalyst component (B) and the catalyst component (C) in a reactor for the preparation of catalyst or in the presence or absence of ethylene in an ethylene polymerization reactor to prepare a catalyst;

(8) a process which comprises bringing the catalyst component (B) and the catalyst component (C) into contact with each other in a reactor for the preparation of catalyst, and then bringing the reaction product into contact with the catalyst component (A) and the catalyst component (D) in a reactor for the preparation of catalyst or in the presence or absence of ethylene in an ethylene polymerization reactor to prepare a catalyst;

(9) a process which comprises bringing the catalyst component (B) and the catalyst component (D) into contact with each other in a reactor for the preparation of catalyst, and then bringing the reaction product into contact with the catalyst component (A) and the catalyst component (C) in a reactor for the preparation of catalyst or in the presence or absence of ethylene in an ethylene polymerization reactor to prepare a catalyst; and

(10) a process which comprises bringing the catalyst component (C) and the catalyst component (D) into contact with each other in a reactor for the preparation of catalyst, and then bringing the reaction product into contact with the catalyst component (A) and the catalyst component (B) in a reactor for the preparation of catalyst or in the presence or absence of ethylene in an ethylene polymerization reactor to prepare a catalyst.

Preferred among these processes is the process which comprises bringing the catalyst component (A), the catalyst component (B) and the catalyst component (C) into contact with each other in a reactor for the preparation of catalyst, and then bringing the reaction product into contact with the catalyst component (D) in a reactor for the preparation of catalyst or in the presence or absence of ethylene in an ethylene polymerization reactor to prepare a catalyst. More preferably, a process is used which comprises bringing the catalyst component (A), the catalyst component (B) and the catalyst component (C) into contact with each other in a reactor for the preparation of catalyst to obtain a solid catalyst component, and then bringing the solid catalyst component into contact with the catalyst component (D) in a reactor for the preparation of catalyst or in the presence or absence of ethylene in an ethylene polymerization reactor to prepare a catalyst.

An example of the process for bringing the catalyst components (A) to (D) into contact with each other will be given below. In some detail, the catalyst component (B) is suspended in an inert hydrocarbon solvent such as isobutane, pentane, hexane, heptane, cyclohexane, decane, benzene and toluene. The suspension thus obtained is then brought into contact with a solution of the catalyst components (A), (C) and (D) in the foregoing inert hydrocarbon solvent. In a preferred embodiment, the catalyst components (A) to (C) are brought into contact with each other to obtain a solid catalyst component. The solid catalyst component is then suspended in the foregoing hydrocarbon solvent. The suspension thus obtained is then brought into contact with the catalyst component (D). The temperature at which the catalytic reaction occurs is from 0° C. to 120° C., preferably from 10° C. to 100° C. The time during which the catalytic reaction occurs is from 1 minute to 10 hours, preferably from 1 minute to 5 hours. The amount of the solvent to be used is from 5 to 800 ml per g of the catalyst component (B) used.

The the content of chromium atom in catalyst component (A) is generally from 0.01 to 5% by weight, preferably from 0.05 to 3% by weight, based on the amount of the catalyst component (B). The catalyst component (C) generally contains aluminum atom in an amount of from 1 to 600 mols, preferably from 5 to 400 mols, per mol of chromium atom in the catalyst component (A). The catalyst component (D) is generally contained in an amount of from 0.01 mmol to 10 mols, preferably from 0.1 mmol to 5 mols, per mol of chromium atom in the chromium compound (A).

In such a contacting process, the components may be dried at a temperature of not higher than 100° C. under reduced pressure to give a solid catalyst component. However, it is important that the organic chromium compound supported on the carrier has not been calcined. The term "calcining" as used herein is meant to indicate treatment at a temperature of from 300° C. to 1,000° C. in an oxygen-containing gas. If calcined, the organic chromium compound is converted to a hexavalent chromium oxide which cannot exert the effect of the present invention even when brought into contact with the components (C) and (D).

The foregoing catalyst may be used in combination with an organic metal compound. This can exert an effect of enhancing the polymerization activity and inhibiting the attachment of a polymer to the wall of the reactor.

As the organic metal compound employable herein there may be used an organic metal compound of the Group 1, 2 or 3 element (according to Nomenclature of Inorganic Chemistry, 1990). Specific examples of such an organic metal compound wherein the metal is lithium, magnesium or aluminum will be given below.

Examples of the organic metal compound wherein the metal is lithium include alkyllithium such as methyllithium, ethyllithium, n-propyllithium, n-butyllithium, isobutyllithium, sec-butyllithium, tert-butyllithium, n-pentyllithium and isopentyllithium.

Examples of the organic metal compound wherein the metal is magnesium include dialkylmagnesium such as n-butylethylmagnesium, di-sec-butylmagnesium, n-butyl-sec-butylmagnesium, di-tert-butylmagnesium, dineopentylmagnesium and di-n-hexylmagnesium.

Examples of the organic metal compound wherein the metal is aluminum include trialkylaluminum such as trimethylaluminum, triethylaluminum, tri-n-propylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tricyclohexylaluminum, dialkylalkylamluminum halide such as dimethylaluminum chloride, diethylaluminum chloride and diisobutylaluminum chloride, dialkylaluminum alkoxide such as diethylaluminum ethoxide, and dialkylaluminum aryloxide such as diethylaluminum phenoxide.

Examples of the organic metal compound comprising lithium and aluminum include lithium tetramethylaluminate, lithium trimethylethylaluminate, lithium trimethylpropylaluminate, lithium trimethylbutylaluminate, lithium trimethylhexylaluminate, lithium trimethyloctylaluminate, lithium triethylmethylaluminate, lithium tetraethylaluminate, lithium triethylpropylaluminate, lithium triethylbutylaluminate, lithium triethylhexylaluminate, lithium triethyloctylaluminate, lithium tributylmethylaluminate, lithium tributylethylaluminate, lithium tributylpropylaluminate, lithium tetrabutylaluminate, lithium tributylhexylaluminate, lithium tributyloctylaluminate, lithium triisobutylmethylaluminate, lithium triisobutylethylaluminate, lithium triisobutylpropylaluminate, lithium triisobutylbutylaluminate, lithium triisobutylhexylaluminate, lithium triisobutyloctylaluminate, lithium trihexylmethylaluminate, lithium trihexylethylaluminate, lithium trihexylbutylaluminate, lithium tetrahexylaluminate, lithium trihexyloctylaluminate, lithium trioctylmethylaluminate, lithium trioctylethylaluminate, lithium trioctylethylaluminate, lithium trioctylbutylaluminate, lithium trioctylhexylaluminate, and lithium tetraoctylaluminate.

Examples of the organic metal compound comprising magnesium and aluminum include ethyl magnesium tetramethylaluminate, ethyl magnesium trimethylethylaluminate, ethyl magnesium trimethylpropylaluminate, ethyl magnesium trimethylbutylaluminate, ethyl magnesium trimethylhexylaluminate, ethyl magnesium trimethyloctylaluminate, ethyl magnesium triethylmethylaluminate, ethyl magnesium tetraethylaluminate, ethyl magnesium triethylpropylaluminate, ethyl magnesium triethylbutylaluminate, ethyl magnesium triethylhexylaluminate, ethyl magnesium triethyloctylaluminate, ethyl magnesium tributylmethylaluminate, ethyl magnesium tributylethylaluminate, ethyl magnesium tetrabutylaluminate, ethyl magnesium tributylhexylaluminate, ethyl magnesium tributyloctylaluminate, ethyl magnesium triisobutylmethylaluminate, ethyl magnesium triisobutylethylaluminate, ethyl magnesium triisobutylbutylaluminate, ethyl magnesium triisobutylhexylaluminate, ethyl magnesium triisobutyloctylaluminate, butyl magnesium tetramethylaluminate, butyl magnesium trimethylethylaluminate, butyl magnesium trimethylpropylaluminate, butyl magnesium trimethylbutylaluminate, butyl magnesium trimethylhexylaluminate, butyl magnesium trimethyloctylaluminate, butyl magnesium triethylmethylaluminate, butyl magnesium tetraethylaluminate, butyl magnesium triethylpropylaluminate, butyl magnesium triethylbutylaluminate, butyl magnesium triethylhexylaluminate, butyl magnesium triethyloctylaluminate, butyl magnesium triisobutylmethylaluminate, butyl magnesium triisobutylethylaluminate, butyl magnesium tetraisobutylaluminate, butyl magnesium triisobutylhexylaluminate, butyl magnesium triisobutyloctylaluminate, hexyl magnesium tetramethylaluminate, hexyl magnesium trimethylethylaluminate, hexyl magnesium trimethylpropylaluminate, hexyl magnesium trimethylbutylaluminate, hexyl magnesium trimethylhexylaluminate, hexyl magnesium trimethyloctylaluminate, hexyl magnesium triethylmethylaluminate, hexyl magnesium tetraethylaluminate, hexyl magnesium triethylpropylaluminate, hexyl magnesium triethylbutylaluminate, hexyl magnesium triethylhexylaluminate, hexyl magnesium triethyloctylaluminate, hexyl magnesium tributylmethylaluminate, hexyl magnesium tributylethylaluminate, hexyl magnesium tetrabutylaluminate, hexyl magnesium tributylhexylaluminate, hexyl magnesium tributyloctylaluminate, magnesium bis (tetramethylaluminate), magnesium bis (tetraethylaluminate), magnesium bis (tetrapropylaluminate), magnesium bis (tetrabutylaluminate), magnesium bis (tetraisobutylaluminate), magnesium bis (tetrahexylaluminate), and magnesium bis (tetraoctylaluminate).

These organic metal compounds comprising two kinds of metals can be obtained by bringing two corresponding organic compounds into contact with each other. This contacting reaction can be effected in an inert hydrocarbon solvent such as pentane, hexane, heptane, octane, decane, cyclopentane, cyclohexane, benzene, toluene and xylene. The temperature at which the catalytic reaction occurs is from −50° C. to 200° C., preferably from −20° C. to 100° C., more preferably from 0° C. to 50° C. The time during which the catalytic reaction occurs is from 0.05 to 200 hours, preferably from 0.2 to 20 hours.

As the organic metal compound according to the present invention there may be used one or more of the foregoing organic metal compounds in combination.

The amount of the organic metal compound to be used is normally from 1 to 2,000 mols, preferably from 1 to 1,500 mols, per mol of metal atom in the transition metal compound as calculated in terms of total amount of metal atoms in the organic metal compound.

In the implementation of the present invention, the polymerization of ethylene can be accomplished by liquid phase polymerization such as slurry polymerization and solution polymerization or gas phase polymerization. The liquid phase polymerization is normally effected in a hydrocarbon solvent. As such a hydrocarbon solvent there may be used an inert hydrocarbon solvent such as propane, butane, isobutane, hexane, cyclohexane, heptane, benzene, toluene and xylene, singly or in admixture. The polymerization may be effected in two or more stages under different reaction conditions. The amount of the ethylenic polymerization catalyst used in the process for producing an ethylenic polymer according to the present invention is not particularly limited, and is generally from $10^{-8}$ to $10^{-2}$ mol/l, preferably from $10^{31\ 7}$ to $10^{-3}$ mol/l, in terms of the concentration of the transition metal compound in the polymerization system. The pressure of ethylene and other olefins, if any, in the polymerization system can be selected within wide ranges, and is preferably from ordinary pressure to 50 kg/cm². The polymerization temperature can also be selected within wide ranges, and is generally from −30 to 200° C., preferably from 0° to 120° C., and particularly preferably from 50° to 100° C. from the standpoint of productivity. The molecular weight of the polymer obtained can be properly controlled by controlling the polymerization temperature or by effecting the polymerization reaction in the presence of hydrogen or the like in the polymerization reaction vessel. Further, the distribution of molecular weight of the polymer obtained can be properly controlled by controlling the amount of the catalyst components to be used.

If necessary, α-olefins such as propylene, 1-butene, 1-hexene, 4-methyl-1-pentene and 1-octene may be introduced into the polymerization reaction vessel, singly or in combination, so that they can be copolymerized with ethylene. The content of α-olefin in the ethylenic polymer obtained is preferably not more than 20 mol %, particularly not more than 15 mol %.

The present invention will be further described in the following examples and comparative examples, but the present invention should not be construed as being limited thereto.

The conditions of ethylene polymerization and copolymerization (kind of catalyst, amount of catalyst used, polymerization temperature, hydrogen/ethylene weight ratio) used in the following examples are set forth in Table 1.

The measurement methods used in the following examples and comparative examples will be described below.

1. Pretreatment of polymer to be measured for physical properties: For this pretreatment, a plastograph available from Toyo Seiki K. K. was used. As an additive there was added 0.2 wt % of B225 available from Ciba Geigy Inc. The mixture was kneaded at a temperature 190° C. in the presence of nitrogen for 7 minutes.

2. Molecular weight, molecular weight distribution: Gel permeation chromatography (GPC) was used to determine the number-average molecular weight (Mn) and the weight-average molecular weight (Mw) of the specimen. The molecular weight distribution is represented by the ratio of Mw to Mn (Mw/Mn). The greater Mw/Mn is, the wider is the molecular weight distribution. The measurement conditions are as follows:

Equipment: WATERS 150C Model

Column: Shodex-HT806M

Solvent: 1,2,4-Trichlorobenzene

Temperature: 135° C.

Sample concentration: 2 mg/5 ml

Monodisperse polystyrene fraction is used to effect universal evaluation.

3. Melt flow rate: Melt flow rate was measured at a temperature of 190° C. under a load of 21.6 kg in accordance with JIS K-7210 (Condition 14, Table 1). The measurements were given as HLMFR.

4. Density: Density was measured in accordance with JIS K-6760.

5. Melt tension: A melt tension tester available from Toyo Seiki K.K. was used. The measurement was conducted at a resin temperature of 190° C., an orifice diameter of 2.1 mm, an orifice length of 8 mm, an extrusion rate of 15 mm/min, and a take-off speed of 6.5 mm/min.

6. Presence of melt fracture: The presence of melt fracture was confirmed by observing the strand during the measurement of melt flow rate.

7. Tensile elongation at break: A tensilon available from Toyo Seiki K.K. was used. The measurement was conducted in accordance with JIS K-6760.

The compounds used in the following examples were obtained as follows:

8. Chromium compound

Bis(tert-butyl) chromate was synthesized by a method described in *Synth. Commun.*, vol. 10, p. 905 (1980). Tris (bistrimethylsilylamide) chromium was synthesized by a method described in *J. Chem. Soc. (a)*, p. 1433 (1971). (Pentamethylcyclopentadienyl) (dimethyl) chromium-THF complex was synthesized by a method described in *J. Am. Chem. Soc.*, vol. 111, p. 9127 (1989). Chromium acetate and chromium acetyl acetonate used were available from Wako Pure Chemical industries, Ltd. Bis(cyclopentadienyl) chromium used was available from STREM Co., Ltd.

9. Transition metal compound comprising a group having conjugated π electron as a ligand Dimethylsilylene (tert-butylamide) (tetramethylcyclopentadienyl) titanium dichloride used was synthesized by a method described in JP-A-3-163088. (Cyclopetnadienyl) (N,N'-bis(trimethylsilyl) benzamidinato) zirconium dichloride used was synthesized by a method described in *J. Org. Chem.*, vol. 491, p. 153

(1995). Bis (methylcyclopentadienyl) zirconium dichloride, bis(n-propylcyclopentadienyl) zirconium dichloride, bis(n-butylcyclopentadienyl) zirconium dichloride and ethylene bis(indenyl) zirconium dichloride used were available from Witco Inc.

10. Organic metal compound n-Butyllithium used was available from Aldrich Inc. Further, n-butylethylmagnesium, triisobutylaluminum and other organic metal compounds used were available from Toso Akzo Co., Ltd.

Preparation of solid catalyst component

In a flask in which the air within had been replaced by nitrogen were charged 3 g of silica (Grade CARiACT P-3, available from Fuji Silysia Chemical, Ltd.) which had been dried at a temperature of 400° C. in nitrogen for 8 hours and 30 ml of hexane to make a slurry. To the slurry thus obtained was then added a 0.1 mol/l hexane solution of a chromium compound set forth in Table 1 in such an amount that the supported amount of chromium atom reached the value set forth in Table 1. The mixture was then stirred at a temperature of 40° C. for 2 hours. The solvent was then removed from the solution in vacuo. To the residue was then added 30 ml of toluene to make a slurry. To the slurry was then added a 1.1 mol/l toluene slurry of a methylaluminoxane available from Toso Akzo Co., Ltd. in such an amount that the molar ratio of aluminum atom to chromium atom in the methylaluminoxane reached the value set forth in Table 1. The mixture was then stirred at a temperature of 40° C. for 2 hours. The solvent was then removed from the solution in vacuo. To the residue was then added 30 ml of hexane to make a slurry. To the slurry was then added a 0.5 mmol/l hexane solution, of a transition metal compound set forth in Table 1. The mixture was then stirred at room temperature for 5 minutes. The solvent was then removed from the solution in vacuo to obtain a solid catalyst component (1).

Preparation of solid catalyst component (2)

In a flask in which the air within had been replaced by nitrogen were charged 3 g of silica (Grade CARiACT P-3, available from Fuji Silysia Chemical, Ltd.) which had been dried at a temperature of 400° C. in nitrogen for 8 hours and 30 ml of hexane to make a slurry. To the slurry thus obtained was then added a 1.1 mol/l toluene slurry of a methylaluminoxane available from Toso Akzo Co., Ltd. in such an amount that the molar ratio of aluminum atom to chromium atom in the methylaluminoxane reached the value set forth in Table 1 when the supported amount of chromium atom set forth in Table 1. The mixture was then stirred at a temperature of 40° C. for 2 hours. The solvent was then removed from the solution in vacuo. To the residue was then added 30 ml of hexane to make a slurry. To the slurry was then added a 0.1 mol/l hexane solution of a chromium compound set forth in Table 1 in such an amount that the supported amount of chromium atom reached the value set forth in Table 1. The mixture was then stirred at a temperature of 40° C. for 2 hours. The solvent was then removed from the solution in vacuo. To the residue was then added 30 ml of hexane to make a slurry. To the slurry was then added a 0.5 mmol/l hexane solution of a transition metal compound set forth in Table 1. The mixture was then stirred at room temperature for 5 minutes. The solvent was then removed from the solution in vacuo to obtain a solid catalyst component (2).

Preparation of solid catalyst component

In a flask in which the air within had been replaced by nitrogen were charged 3 g of silica (Grade CARiACT P-3, available from Fuji Silysia Chemical, Ltd.) which had been dried at a temperature of 400° C. in nitrogen for 8 hours and 30 ml of hexane to make a slurry. To the slurry thus obtained was then added a 0.1 mol/l hexane solution of a chromium compound set forth in Table 1 in such an amount that the supported amount of chromium atom reached the value set forth in Table 1. The mixture was then stirred at a temperature of 40° C. for 2 hours. The solvent was then removed from the solution in vacuo. To the residue was then added 30 ml of toluene to make a slurry. To the slurry was then added a 1.1 mol/l toluene slurry of a methylaluminoxane available from Toso Akzo Co., Ltd. in such an amount that the molar ratio of aluminum atom to chromium atom in the methylaluminoxane reached the value set forth in Table 1. The mixture was then stirred at a temperature of 40° C. for 2 hours. The solvent was then removed from the solution in vacuo to obtain a solid catalyst component (3).

Preparation of solid catalyst component (4)

In a flask in which the air within had been replaced by nitrogen were charged 3 g of silica (Grade CARiACT P-3, available from Fuji Silysia Chemical, Ltd.) which had been dried at a temperature of 400° C. in nitrogen for 8 hours and 30 ml of toluene to make a slurry. To the slurry thus obtained was then added a 1.1 mol/l toluene slurry of a methylaluminoxane available from Toso Akzo Co., Ltd. in such an amount that the molar ratio of aluminum atom to chromium atom in the methylaluminoxane reached the value set forth in Table 1 when the supported amount of chromium atom set forth in Table 1. The mixture was then stirred at a temperature of 40° C. for 2 hours. The solvent was then removed from the solution in vacuo. To the residue was then added 30 ml of hexane to make a slurry. To the slurry thus obtained was then added a 0.1 mol/l hexane solution of a chromium compound set forth in Table 1 in such an amount that the supported amount of chromium atom reached the value set forth in Table 1. The mixture was then stirred at a temperature of 40° C. for 2 hours. The solvent was then removed from the solution in vacuo to obtain a solid catalyst component (4).

EXAMPLES 1 TO 6

Polymerization of ethylene

In a 1.5 autoclave in which the air within had been replaced by nitrogen were charged a solid catalyst component (1) set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$ to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 7 TO 12

Polymerization of ethylene.

In a 1.5 l autoclave in which the air within had been replaced by nitrogen were charged a solid catalyst component (1) set forth in Table 1, 1.2 ml (0.6 mmol) of a 0.5 mol/l hexane solution of an organic metal compound set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$ to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 13 TO 18

Polymerization of ethylene

In a 1.5 l autoclave in which the air within had been replaced by nitrogen were charged a solid catalyst component (3) set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$. A 0.5 mmol/l hexane solution of a transition metal compound set forth in Table 1 was then charged in the autoclave to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 19 TO 24

Polymerization of ethylene

In a 1.5 l autoclave in which the air within had been replaced by nitrogen were charged a solid catalyst component (3) set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$. A 0.5 mmol/l hexane solution of a transition metal compound set forth in Table 1 and 1.2 ml (0.6 mmol) of a 0.5 mol/l hexane solution of an organic metal compound set forth in Table 1 were then charged in the autoclave to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 25 TO 30

Polymerization of ethylene

In a 1.5 l autoclave in which the air within had been replaced by nitrogen were charged a solid catalyst component (2) set forth in Table 1, 1.2 ml (0.6 mmol) of a 0.5 mol/l hexane solution of an organic metal compound set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$ to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 31 TO 36

Polymerization of ethylene

In a 1.5 l autoclave in which the air within had been replaced by nitrogen were charged a solid catalyst component (4) set forth in Table 1 and 600 ml of isobutane. The temperature in the autoclave was then raised to the polymerization temperature. Subsequently, a mixture of hydrogen and ethylene having a proportion set forth in Table 2 was pressed into the autoclave until the partial pressure thereof reached 14.0 kg/cm$^2$. A 0.5 mmol/l hexane solution of a transition metal compound set forth in Table 1 and 1.2 ml (0.6 mmol) of a 0.5 mmol/l hexane solution of an organic metal compound set forth in Table 1 were then charged in the autoclave to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

EXAMPLES 37 TO 42

Copolymerization of ethylene with 1-hexene

In a 1.5 l autoclave in which the air within had been replaced by nitrogen were charged a solid catalyst component (3) set forth in Table 1 and 600 ml of isobutane. The temperature in the autoclave was then raised to the polymerization temperature. Subsequently, 1-hexene and a mixture of hydrogen and ethylene having a proportion set forth in Table 2 were pressed into the autoclave until the partial pressure of the mixed gas reached 14.0 kg/cm$^2$. A 0.5 mmol/l hexane solution of a transition metal compound set forth in Table 1 and 1.2 ml (0.6 mmol) of a 0.5 mol/l hexane solution of an organic metal compound set forth in Table 1 were then charged in the autoclave to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

COMPARATIVE EXAMPLE 1

The procedure of Example 1 was followed to polymerize ethylene except that a solid catalyst component (1) free of chromium compound was used. The results are set forth in Tables 1 and 2.

COMPARATIVE EXAMPLES 2 TO 4

The procedure of Example 1 was followed to polymerize ethylene except that the transition metal compound was not used. The results are set forth in Tables 1 and 2.

COMPARATIVE EXAMPLE 5

Preparation of solid catalyst component (5)

30 g of silica (Grade 952, available from DAVISON Inc.) was charged in a flask. In the flask was then charged a solution of chromium acetate (available from Wako Pure Chemical industries, Ltd.) in 100 ml of distilled water in such an amount that the supported amount of chromium atom reached the value set forth in Table 1. The mixture was then stirred at room temperature for 30 minutes. The distilled water was then removed from the slurry thus obtained at a temperature of 40° C. under reduced pressure. The powder thus obtained was then put into a cylindrical calcining electric furnace (diameter: 38 mm; with a porous plate grating). The material was then heated at a rate of 90° C./hr in the presence of nitrogen gas which flew at a linear speed of 4 cm/sec. When the temperature reached 600° C., nitrogen was replaced by air. The material was calcined at the same temperature in the presence of air which flew at the same linear speed for 8 hours. The atmosphere was then switched back to nitrogen. The material was allowed to cool to room temperature to obtain a solid catalyst component (5).

Polymerization of ethylene

In a 1.5 l autoclave in which the air within had been replaced by nitrogen were charged a solid catalyst component (5) set forth in Table 1, a 1.1 mol/l toluene slurry of a methylaluminoxane (available from Toso Akzo Co., Ltd.) having an aluminum atom molar ratio to chromium atom in the solid catalyst component as set forth in Table 1, a 0.5 mmol/l hexane solution of a transition metal compound set forth in Table 1 and 600 ml of isobutane. The temperature in the autoclave was then raised to the polymerization temperature.

Subsequently, a mixture of hydrogen and ethylene was pressed into the autoclave until the partial pressure thereof reached 14.0 kg/cm$^2$ to initiate polymerization. Thereafter, the polymerization was effected for 30 minutes while the partial pressure of the mixed gas was being kept at the same value. Subsequently, the gas contents of the autoclave were released from the system to terminate the polymerization. The results are set forth in Table 2.

TABLE 1

| | | | Solid catalyst component | | | Transition metal compound | | Organic metal compound |
|---|---|---|---|---|---|---|---|---|
| Example | Kind | Chromium compound | Supported amount (wt %) | Al/Cr molar ratio | Amount (mg) | Kind | Amount (mmol) | |
| 1 | (1) | Chromium acetate | 1.0 | 50 | 175 | A | 0.029 | — |
| 2 | (1) | Chromium acetyl-acectonate | 0.3 | 120 | 165 | A | 0.033 | — |
| 3 | (1) | Bis(tert-butyl) chromate | 0.2 | 50 | 163 | E | 0.027 | — |
| 4 | (1) | Tris(bistrimethyl silylamide)Cr | 0.2 | 120 | 134 | B | 0.040 | — |
| 5 | (1) | Bis(cyclopenta-dienyl)Cr | 1.0 | 30 | 181 | C | 0.032 | — |
| 6 | (1) | a | 0.5 | 50 | 177 | F | 0.027 | — |
| 7 | (1) | Chromium acetate | 0.5 | 80 | 218 | E | 0.054 | n-BuLi |
| 8 | (1) | Chromium acetyl-acetonate | 0.3 | 120 | 174 | D | 0.0012 | (i-Bu)$_3$Al + n-BuEtMg |
| 9 | (1) | Bis(triphenyl-silyl)chromate | 0.2 | 50 | 193 | B | 0.0027 | (i-Bu)$_3$Al |
| 10 | (1) | Tris(bistrimethyl silylamide)Cr | 0.2 | 120 | 163 | A | 0.0031 | (i-B)$_3$Al + BuLi |
| 11 | (1) | Bis(cyclopenta-dienyl)Cr | 1.0 | 30 | 187 | C | 0.0037 | LiAlMe$_4$ |
| 12 | (1) | a | 0.5 | 50 | 178 | D | 0.0072 | n-BuEtMg |
| 13 | (3) | Chromium acetate | 0.3 | 100 | 156 | B | 0.027 | — |
| 14 | (3) | Chromium acetyl-acetonate | 0.5 | 100 | 153 | E | 0.034 | — |
| 15 | (3) | Bis(triphenyl silyl)chromate | 0.5 | 30 | 147 | F | 0.027 | — |
| 16 | (3) | Tris(bistrimethyl silylamide)Cr | 0.1 | 240 | 198 | D | 0.025 | — |
| 17 | (3) | Bis(cyclopenta-dienyl)Cr | 0.5 | 50 | 151 | A | 0.036 | — |
| 18 | (3) | a | 1.0 | 50 | 184 | C | 0.030 | — |
| 19 | (3) | Chromium acetate | 0.3 | 100 | 195 | A | 0.0016 | n-BuEtMg + n-BuLi |
| 20 | (3) | Chromium acetyl acetonate | 0.5 | 100 | 143 | F | 0.0021 | Mg(AlMe$_4$)$_2$ |
| 21 | (3) | Bis(tert-butyl) chromate | 0.5 | 30 | 151 | A | 0.0047 | (i-Bu)$_3$Al + BuLi |
| 22 | (3) | Tris(bistrimethyl silylamide)Cr | 0.1 | 240 | 156 | C | 0.0025 | (i-Bu)$_3$Al |
| 23 | (3) | Bis((cyclopenta-dienyl)Cr | 0.5 | 50 | 225 | B | 0.0053 | EtMgAlEt$_4$ |
| 24 | (3) | a | 1.0 | 50 | 148 | E | 0.0027 | (i-Bu)$_3$Al + BuEtMg |
| 25 | (2) | Chromium acetate | 0.2 | 200 | 181 | F | 0.0010 | LiAlMe$_4$ |
| 26 | (2) | Chromium acetyl-acetonate | 1.0 | 50 | 157 | C | 0.0025 | n-BuLi |
| 27 | (2) | Bis(triphenyl-silyl)chromate | 0.5 | 30 | 193 | A | 0.0031 | Mg(AlMe$_4$)$_2$ |
| 28 | (2) | Tris(bistrimethyl silylamide)Cr | 0.5 | 100 | 149 | E | 0.0031 | (i-Bu)$_3$Al + BuLi |
| 29 | (2) | Bis(cyclopenta-dienyl)Cr | 0.5 | 50 | 170 | B | 0.0040 | (i-Bu)$_3$Al |
| 30 | (2) | a | 0.2 | 100 | 158 | D | 0.0048 | n-BuEtMg |
| 31 | (4) | Chromium acetate | 0.5 | 100 | 138 | C | 0.0050 | (i-Bu)$_3$Al + n-BuLi |
| 32 | (4) | Chromium acetyl- | 0.3 | 150 | 135 | B | 0.0053 | EtMgAlEt$_4$ |

TABLE 1-continued

| | | | Solid catalyst component | | | Transition metal compound | | Organic metal compound |
|---|---|---|---|---|---|---|---|---|
| Example | Kind | Chromium compound | Supported amount (wt %) | Al/Cr molar ratio | Amount (mg) | Kind | Amount (mmol) | |
| 33 | (4) | Bis(tert-butyl) chromate | 0.2 | 30 | 143 | E | 0.0081 | n-BuEtMg |
| 34 | (4) | Tris(bistrimethyl silylamide)Cr | 0.2 | 120 | 175 | F | 0.0031 | n-BuLi |
| 35 | (4) | Bis(cyclopenta-dienyl)Cr | 1.0 | 30 | 133 | A | 0.0031 | (i-Bu)$_3$Al |
| 36 | (4) | a | 0.5 | 50 | 138 | D | 0.0036 | LiAlMe$_4$ |
| 37 | (3) | Chromium acetate | 0.3 | 100 | 168 | D | 0.0036 | (i-Bu)$_3$Al + BuEtMg |
| 38 | (3) | Chromium acetyl-acetonate | 0.5 | 100 | 141 | B | 0.0027 | Mg(AlMe$_4$)$_2$ |
| 39 | (3) | Bis(tert-butyl) chromate | 0.5 | 30 | 155 | F | 0.0010 | (i-Bu)$_3$Al + n-BuLi |
| 40 | (3) | Tris(bistrimethyl silylamide)Cr | 0.1 | 240 | 140 | C | 0.0025 | (i-Bu)$_3$Al |
| 41 | (3) | Bis(cyclopenta-dienyl)Cr | 0.5 | 50 | 187 | D | 0.0036 | EtMgAlEt$_4$ |
| 42 | (3) | a | 1.0 | 50 | 139 | A | 0.0047 | n-BuEtMg + BuLi |
| Comparative Example 1 | (1) | — | 0 | — | 195 | A | 0.0012 | — |
| Comparative Example 2 | (1) | Chromium acetyl acetonate | 0.3 | 120 | 357 | — | — | — |
| Comparative Example 3 | (1) | Bis(cyclopenta-dienyl)Cr | 1.0 | 30 | 341 | — | — | — |
| Comparative Example 4 | (1) | a | 0.5 | 50 | 348 | — | — | — |
| Comparative Example 5 | (5) | Chromium acetate | 1.0 | 50 | 250 | A | 0.047 | — |

Note:
a: (Pentamethylcyclopentadienyl) (dimethyl) chromium-TFH complex
A: Bis(methylcyclopentadienyl) zirconium dichoride
B: Bis(n-propylcyclopentadienyl) zirconium dichloride
C: Bis(n-butylcyclopentadienyl) zirconium dichloride
D: Ethylene bis(indenyl) zirconium dichloride
E: Dimethylsilylene (tert-butylamide) (tetramethylcyclopentadienyl) titanium dichloride
F: (Cyclopentadienyl) (N,N'-bis(trimethylsilyl) benzamidinate) zirconium dichloride

TABLE 2

| Example | Polymerization temperature (°C.) | Hydrogen/ ethylene ratio | Yield of polymer (g) | HLMFR (dg/min) | Mw (× 10$^{-4}$) | Mw/Mn | Density (g/cm$^3$) | Melt tension (g) | Melt fracture | Tensile elongation at break (%) |
|---|---|---|---|---|---|---|---|---|---|---|
| 1 | 90 | 5 × 10$^{-5}$ | 81 | 12.4 | 26.2 | 21.8 | — | 27 | none | 1140 |
| 2 | 85 | 4 × 10$^{-4}$ | 62 | 86.2 | 26.7 | 24.3 | — | 15 | none | 980 |
| 3 | 90 | 5 × 10$^{-5}$ | 85 | 3.4 | 24.5 | 30.6 | — | 33 | none | 1250 |
| 4 | 95 | 1 × 10$^{-4}$ | 78 | 24.7 | 36.9 | 28.4 | — | 24 | none | 1080 |
| 5 | 95 | 7 × 10$^{-5}$ | 83 | 13.4 | 29.7 | 19.8 | — | 28 | none | 1200 |
| 6 | 90 | 1 × 10$^{-4}$ | 80 | 4.2 | 36.1 | 23.7 | — | 31 | none | 1130 |
| 7 | 80 | 3 × 10$^{-4}$ | 115 | 7.5 | 42.5 | 18.5 | — | 29 | none | 1070 |
| 8 | 75 | 5 × 10$^{-5}$ | 108 | 6.8 | 22.3 | 20.3 | — | 32 | none | 1190 |
| 9 | 80 | 2 × 10$^{-4}$ | 102 | 60.3 | 28.0 | 32.3 | — | 16 | none | 1040 |
| 10 | 85 | 7 × 10$^{-5}$ | 135 | 28.6 | 25.7 | 28.3 | — | 23 | none | 1180 |
| 11 | 75 | 3 × 10$^{-4}$ | 105 | 23.5 | 26.1 | 17.4 | — | 23 | none | 1110 |
| 12 | 70 | 1 × 10$^{-4}$ | 154 | 40.7 | 37.6 | 28.9 | — | 21 | none | 1090 |
| 13 | 80 | 2 × 10$^{-4}$ | 72 | 22.5 | 22.4 | 18.7 | — | 24 | none | 1150 |
| 14 | 90 | 7 × 10$^{-5}$ | 84 | 17.1 | 29.8 | 21.6 | — | 27 | none | 1210 |
| 15 | 85 | 4 × 10$^{-4}$ | 67 | 2.8 | 38.1 | 36.8 | — | 35 | none | 1180 |
| 16 | 90 | 7 × 10$^{-5}$ | 68 | 27.4 | 33.0 | 25.3 | — | 24 | none | 1200 |
| 17 | 95 | 3 × 10$^{-4}$ | 59 | 13.4 | 25.7 | 19.8 | — | 26 | none | 1170 |
| 18 | 80 | 2 × 10$^{-4}$ | 78 | 10.2 | 22.8 | 32.6 | — | 29 | none | 1180 |
| 19 | 75 | 7 × 10$^{-5}$ | 103 | 8.7 | 24.1 | 17.2 | — | 32 | none | 1290 |
| 20 | 80 | 2 × 10$^{-4}$ | 105 | 5.4 | 36.9 | 22.4 | — | 32 | none | 1170 |
| 21 | 85 | 5 × 10$^{-5}$ | 131 | 6.1 | 43.7 | 39.7 | — | 34 | none | 1300 |

TABLE 2-continued

| Example | Polymerization temperature (°C.) | Hydrogen/ethylene ratio | Yield of polymer (g) | HLMFR (dg/min) | Mw (× 10$^{-4}$) | Mw/Mn | Density (g/cm$^3$) | Melt tension (g) | Melt fracture | Tensile elongation at break (%) |
|---|---|---|---|---|---|---|---|---|---|---|
| 22 | 70 | 1 × 10$^{-4}$ | 125 | 37.2 | 32.2 | 40.2 | — | 21 | none | 1090 |
| 23 | 80 | 3 × 10$^{-4}$ | 118 | 46.3 | 27.8 | 18.5 | — | 17 | none | 1010 |
| 24 | 75 | 2 × 10$^{-4}$ | 110 | 9.4 | 33.4 | 30.2 | — | 28 | none | 1130 |
| 25 | 85 | 7 × 10$^{-5}$ | 107 | 4.5 | 36.1 | 25.8 | — | 35 | none | 1310 |
| 26 | 90 | 2 × 10$^{-4}$ | 118 | 50.8 | 28.7 | 20.5 | — | 18 | none | 1020 |
| 27 | 80 | 4 × 10$^{-4}$ | 97 | 83.7 | 40.0 | 23.1 | — | 15 | none | 960 |
| 28 | 95 | 5 × 10$^{-5}$ | 122 | 2.4 | 53.4 | 35.6 | — | 36 | none | 1330 |
| 29 | 90 | 3 × 10$^{-4}$ | 87 | 67.0 | 29.3 | 18.3 | — | 16 | none | 990 |
| 30 | 85 | 1 × 10$^{-4}$ | 146 | 52.7 | 30.3 | 17.8 | — | 19 | none | 1020 |
| 31 | 90 | 1 × 10$^{-4}$ | 152 | 81.6 | 26.9 | 20.7 | — | 16 | none | 1000 |
| 32 | 80 | 4 × 10$^{-4}$ | 101 | 131.8 | 40.2 | 26.8 | — | 12 | none | 920 |
| 33 | 85 | 7 × 10$^{-5}$ | 159 | 3.8 | 35.1 | 23.4 | — | 34 | none | 1270 |
| 34 | 70 | 2 × 10$^{-4}$ | 106 | 2.1 | 34.7 | 20.1 | — | 34 | none | 1250 |
| 35 | 75 | 5 × 10$^{-5}$ | 123 | 18.0 | 25.8 | 21.5 | — | 27 | none | 1190 |
| 36 | 90 | 1 × 10$^{-4}$ | 137 | 28.1 | 38.2 | 27.3 | — | 23 | none | 1130 |
| 37 | 80 | 4 × 10$^{-4}$ | 83 | 127.4 | 23.8 | 19.8 | 0.9217 | 12 | none | 900 |
| 38 | 75 | 7 × 10$^{-5}$ | 112 | 10.9 | 28.6 | 20.4 | 0.9225 | 27 | none | 1080 |
| 39 | 75 | 3 × 10$^{-4}$ | 68 | 1.8 | 31.8 | 35.3 | 0.9221 | 20 | none | 1200 |
| 40 | 70 | 2 × 10$^{-4}$ | 109 | 64.4 | 32.2 | 24.8 | 0.9118 | 22 | none | 910 |
| 41 | 80 | 5 × 10$^{-5}$ | 133 | 7.0 | 28.3 | 17.7 | 0.9215 | 29 | none | 990 |
| 42 | 75 | 4 × 10$^{-4}$ | 95 | 107.5 | 37.0 | 30.8 | 0.9130 | 19 | none | 930 |
| Comparative Example1 | 90 | 5 × 10$^{-5}$ | 104 | 36.8 | 8.0 | 2.9 | — | 2 | none | 200 |
| Comparative Example2 | 85 | 4 × 10$^{-4}$ | 145 | 1.4 | 24.6 | 12.3 | — | 8 | none | 700 |
| Comparative Example3 | 95 | 7 × 10$^{-5}$ | 132 | 5.2 | 22.8 | 6.5 | — | 9 | none | 710 |
| Comparative Example4 | 90 | 1 × 10$^{-4}$ | 125 | 0.7 | 23.8 | 9.5 | — | 12 | none | 660 |
| Comparative Example5 | 90 | 5 × 10$^{-5}$ | 81 | 47.3 | 23.7 | 16.1 | — | 6 | yes | 570 |

As ethylenic polymers to be used as a starting material of inflation film or a material to be blow-molded, those having a relatively great molecular weight and a wide molecular weight distribution are required. However, ethylenic polymers obtained by the polymerization of ethylene in the presence of any of many ethylenic polymerization catalysts which have heretofore been proposed have an insufficient molecular weight distribution. Further, the preparation process with these conventional ethylenic polymerization catalysts is complicated and thus is unsuitable for industrial production. Moreover, if an ethylenic polymerization catalyst comprising Phillips catalyst, an aluminoxane and a metallocene complex is used, an ethylenic polymer having a wide molecular weight distribution can be obtained. However, most such ethylenic polymers have a poor dispersibility, a low melt tension and a low tensile elongation at break and show some melt fracture and thus leave something to be desired.

The ethylenic polymerization catalyst proposed herein gives solution to these problems. The ethylenic polymer obtained by the polymerization of ethylene in the presence of the ethylenic polymerization catalyst according to the present invention has a relatively high molecular weight, a wide molecular weight distribution, a high melt tension and a sufficient tensile elongation at break and shows no melt fracture. Thus, the ethylenic polymerization catalyst according to the present invention allows an efficient and easy production of an ethylenic polymer to be formed into inflation film or blow-molded.

While the invention has been described in detail and with reference to specific embodiments thereof, it will be apparent to one skilled in the art that various changes and modifications can be made therein without departing from the spirit and scope thereof.

What is claimed is:

1. An ethylenic polymerization catalyst comprising (A) a chromium compound selected from the group consisting of compounds of formulae (1) to (6):

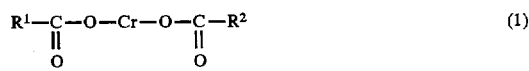

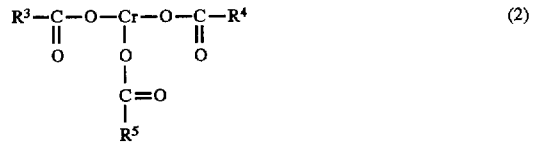

wherein in formulas (1) and (2) $R^1$, $R^2$, $R^3$, $R^4$ and $R^5$ may be the same or different and each represents a hydrogen atom or a $C_{1-18}$ hydrocarbon group;

wherein in formula (3) Y represents a 1,3-diketo chelate ligand; $Z^1$ and $Z^2$ may be the same or different; each is selected from the group consisting of a halogen atom, and e represents a number of from 1 to 3, with the proviso that e, f and g satisfy the relationship:

$$e + f + g = 3$$

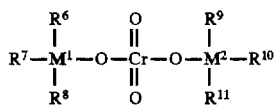

wherein in formula (4) $R^6$, $R^7$, $R^8$, $R^9$, $R^{10}$ and $R^{11}$ may be the same or different and each represents a $C_{1-18}$ hydrocarbon group; and $M^1$ and $M^2$ each represents a carbon atom or a silicon atom;

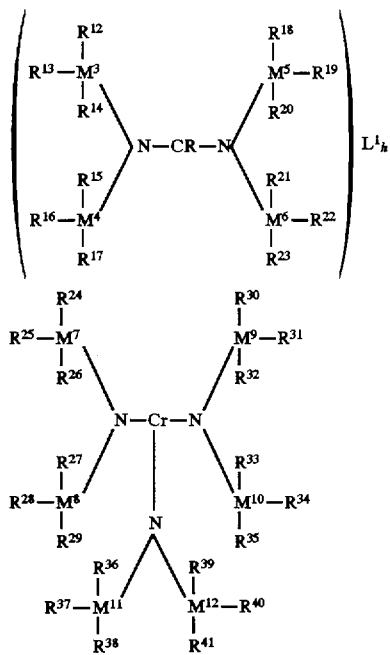

wherein in formulas (5) and (6) $R^{12}$ and $R^{41}$ may be the same or different and each represents a hydrogen atom or a $C_{1-18}$ hydrocarbon group; $M^3$ to $M^{12}$ each represent a carbon atom or a silicon atom; $L^1$ represents a ligand and h represents a number of from 0 to 2, (B) a carrier, (C) aluminoxane, and (D) a transition metal compound comprising a group with a conjugated π electron as a ligand and selected from the group consisting of compounds of formulae (14) to (20):

$(Cp^2)_u(Cp^3)_uMe(Q^1)_{3-u}$ (14)

$R^{51}(Cp^2)(Cp^3)Me(Q^1)(Q^2)$ (15)

$R^{51}(Cp^2)(Y)Me(Q^1)(Q^2)$ (16)

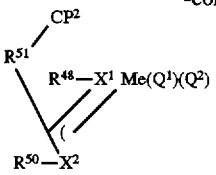 (17)

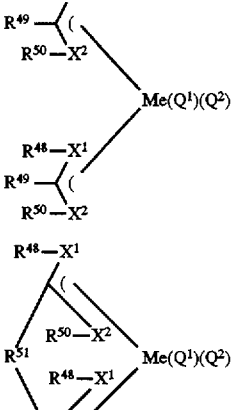

wherein $Cp^2$ and $Cp^3$ may be the same or different and each represents a ligand having a cyclopentadienyl skeleton; $R^{48}$ to $R^{50}$ may be the same or different and each represents a hydrogen atom, a $C_{1-20}$ hydrocarbon group, an alkylsilyl group or an alkylgermyl group; $R^{51}$ represents a $C_{1-20}$ alkylene group, an alkylgermylene group or an alkylsilylene group; $X^1$ and $X^2$ may be the same or different and each represents a carbon atom or a nitrogen atom; $Q^1$ and $Q^2$ may be the same or different and each represents a hydrogen atom, a $C_{1-20}$ hydrocarbon group, an alkoxy group, an aryloxy group, a siloxy group or a halogen atom; Y represents an electron donor ligand represented by —O—, —S—, —NR$^{52}$— or —PR$^{52}$—, in which $R^{52}$ represents a hydrogen atom, a $C_{1-20}$ hydrocarbon group, a halogenated alkyl group or a halogenated aryl group; Me represents a transition metal; and u represents an integer of 0 or 1;

$R^{51}$ represents a $C_{1-20}$ alkylene group, an alkylgermylene group or an alkylsilylene group;

$X^1$ and $X^2$ may be the same or different and each represents a carbon atom or nitrogen atome, $Q^1$ and $Q^2$ may be the same or different and each represents a $C_{1-20}$ hydrocarbon group, a siloxy group or a halogen atom; and Y represents an electron donor ligand represented by —O—, —S—, NR$^{52}$— or —PR$^{52}$—; $R^{52}$ represents a $C_{1-20}$ hydrocarbon group, a halogenated alkyl group or a halogenated aryl group;

wherein said chromium compound (A) is not calcined.

2. An ethylenic polymerization catalyst as claimed in claim 1, wherein said chromium compound (A) is at least one compound selected from the group consisting of a chromium carboxylate, a chromium-1,3-diketo compound, a chromic acid ester, and a chromium amide compound.

3. An ethylenic polymerization catalyst as claimed in claim 1, wherein the content of chromium atom in said chromium compound (A) is from 0.01 to 5% by weight based on the amount of said carrier (B).

4. An ethylenic polymerization catalyst as claimed in claim 1, wherein said aluminoxane (C) contains aluminum atom in an amount of from 1 to 600 mols per mol of chromium atom in said chromium compound (A), and said transition metal compound (D) comprising a group with a conjugated π electron as a ligand is contained in an amount of from 0.01 mmol to 10 mols per mol of chromium atom in said chromium compound (A).

5. An ethylenic polymerization catalyst as claimed in claim 1, wherein said ethylenic polymerization catalyst further comprises (E) an organic metal compound incorporated therein.

6. An ethylenic polymerization catalyst as claimed in claim 5, wherein the total amount of metal atoms in said organic metal compound (E) is from 1 to 2,000 mols per mol of metal atom in said transition metal compound (D) comprising a group with a conjugated π electron as a ligand.

* * * * *